US012146466B1

(12) United States Patent
Ruholl

(10) Patent No.: US 12,146,466 B1
(45) Date of Patent: Nov. 19, 2024

(54) BUOYANCY MOTOR

(71) Applicant: Mark F. Ruholl, Poseyville, IN (US)

(72) Inventor: Mark F. Ruholl, Poseyville, IN (US)

( * ) Notice: Subject to any disclaimer, the term of this patent is extended or adjusted under 35 U.S.C. 154(b) by 0 days.

(21) Appl. No.: 18/756,186

(22) Filed: Jun. 27, 2024

(51) Int. Cl.
*F03B 17/02* (2006.01)
*F03B 13/10* (2006.01)

(52) U.S. Cl.
CPC .............. *F03B 17/02* (2013.01); *F03B 13/10* (2013.01)

(58) Field of Classification Search
CPC ................................ F03B 17/02; F03B 13/10
USPC ......................................... 290/42, 43, 53, 54
See application file for complete search history.

(56) References Cited

U.S. PATENT DOCUMENTS 3,934,964 A 1/1976 Diamond
4,054,031 A 10/1977 Johnson
4,325,216 A 4/1982 Mermis
4,363,212 A * 12/1982 Everett .................. F03B 17/02 415/7
8,266,904 B2 9/2012 Brumfield
8,397,496 B2 3/2013 Frank
2006/0288698 A1 12/2006 Dentler
2011/0162356 A1 7/2011 Hastings
2021/0180471 A1 6/2021 Wright

FOREIGN PATENT DOCUMENTS

ES 2585892 A1 * 10/2016
WO WO-2008062084 A1 * 5/2008 ............. F03B 17/02

* cited by examiner

*Primary Examiner* — Charles Reid, Jr.
(74) *Attorney, Agent, or Firm* — Woodard, Emhardt, Henry, Reeves & Wagner, LLP

(57) ABSTRACT

A buoyancy motor is positioned within an interior volume of a vessel and submerged beneath a liquid level of a liquid that fills the vessel. The buoyancy motor includes an upper pulley, a lower pulley, and a belt extending around both the upper pulley and the lower pulley. A plurality of lift arms are hingedly coupled to the belt at a hinged mount. Each of the lift arms includes a connector arm, a float arm, and a float attached to the float arm. The float arms of the lift arms positioned on a first position of the belt are oriented perpendicularly with respect to the belt, and the float arms of the lift arms positioned on a second position of the belt are oriented parallel with respect to the belt. The buoyancy force of the liquid on the floats drives rotation of the belt around about the pulleys.

19 Claims, 7 Drawing Sheets

BUOYANCY MOTOR

BACKGROUND

Buoyancy is a force that is exerted by a fluid that opposes the weight of an object that is positioned within the fluid. Typically, if an object is more dense than the fluid in which the object is positioned, the object will sink. However, if the object is less dense than the fluid in which the object is positioned, the upward force exerted by the fluid will cause the object to rise. Buoyancy may be used as a store of energy which may then be converted into electricity.

Thus, there is a need for improvement in this field.

SUMMARY

Certain embodiments include a buoyancy motor that may include a vessel containing a liquid that defines a liquid level within said vessel. The vessel may include a bottom surface and a plurality of sidewalls extending from said bottom surface to define a vessel interior volume. In some examples, an access opening may be defined in one of said plurality of sidewalls. The access opening provides access into said interior volume of said vessel.

An upper pulley may and a lower pulley may be positioned below said liquid level, and a belt may extend between and be wrapped at least partially around both said upper pulley and said lower pulley. An upper bearing may extend between two opposing sidewalls, and the upper bearing may support said upper pulley so that said upper pulley is rotatable about said upper bearing. A lower bearing may also extend between two opposing sidewalls, and said lower bearing may support said lower pulley so that said lower pulley is rotatable about said lower bearing.

The belt may include a first position defined between a side of said upper pulley and said lower pulley and a second position defined between an opposite side of said upper pulley and said lower pulley with respect to said first position. A plurality of lift arms may be hingedly coupled to said belt at a hinged mount. Each of said lift arms may include a connector arm, a float arm, and a float attached to said float arm. The lift arms may be spaced evenly along the length of said belt. The float arms of said lift arms positioned on said first position of said belt may be oriented perpendicularly with respect to said belt, and said float arms of said lift arms positioned on said second position of said belt may be oriented parallel with respect to said belt. Likewise, in other embodiments, the connector arms of said lift arms positioned on said first position of said belt may be oriented parallel with respect to said belt, and the connector arms of said lift arms positioned on said second position of said belt may be oriented perpendicular with respect to said belt.

In some examples, each of said lift arms may be positioned below said liquid level within said vessel. Additionally, each float of said plurality of lift arms may have a same density and same volume as each of the other floats of said plurality of lift arms.

A drive pulley may be positioned on the exterior of said vessel and may be rotatably coupled to one of said upper pulley or said lower pulley. The drive pulley may be operationally coupled to a generator so that rotation of said drive pulley generates electricity at said generator. In some examples, a diameter of said drive pulley may be greater than a diameter of said upper pulley. The diameter of the drive pulley may also be greater than a diameter of said lower pulley.

In some examples, the buoyancy motor may include a water supply in fluid communication with the interior volume of said vessel and a liquid level sensor positioned within said vessel. The liquid level sensor may be configured to measure the liquid level of said liquid within said vessel. A controller may be in communication with said liquid level sensor and may be in communication with a pump that is in fluid communication with the water supply. The controller may be configured to operate said pump to supply water from said water supply to said vessel when said liquid level is measured below a predetermined height in said vessel.

A method of operating a buoyancy motor may comprise positioning a buoyancy motor within a vessel so that said buoyancy motor is positioned below a liquid level of a liquid that is contained within an interior volume of said vessel. The buoyancy motor may include an upper pulley, a lower pulley, a belt extending between said upper pulley and said lower pulley, and a plurality of lift arms hingedly attached to said belt. Each lift arm may include a float arm and a float attached to said float arm.

The belt is rotated and rotation of said belt may be driven by a buoyancy force of said liquid within said interior volume of said vessel applied to the floats positioned on said lift arms coupled to said belt. The buoyancy force applied by said liquid within said vessel on the floats of said lift arms may be transmitted to said belt at a lift arm base that is attached to said belt.

The belt may include a first position, and said float of each of said lift arms positioned at the first position on said belt may extends substantially perpendicular to said belt. The belt may also include a second position, and said float of each of said lift arms positioned at the second position on said belt may extends substantially parallel to said belt. The lift arm may hinge with respect to said belt as said lift arm rotates with said belt around said upper pulley and said lower pulley.

In one example, the float arm may hinge with respect to said belt so that said float arm moves from being substantially perpendicular to said belt to being substantially parallel to said belt as said lift arm moves from said first position of said belt to said second position of said belt. Likewise, said float arm may move from the position substantially parallel to said belt to the position substantially perpendicular to said belt as said lift arm moves from said second position of said belt to said first position of said belt.

In some examples, the method may include filling at least a portion of said interior volume of said vessel with a liquid either prior to or after positioning the buoyancy motor within the vessel.

In some embodiments, said belt may be supported on said upper pulley so that rotation of said belt causes rotation of said upper pulley. The belt may also be supported on the lower pulley so that rotation of the belt causes rotation of the lower pulley. A generator may be operationally attached to the upper pulley and/or the lower pulley and the generator may be driven by rotation of the upper pulley and/or the lower pulley.

In certain aspects, the method may include sensing the liquid level of the liquid within the interior volume of said vessel and pumping liquid into said vessel if said liquid level is below a predetermined height.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
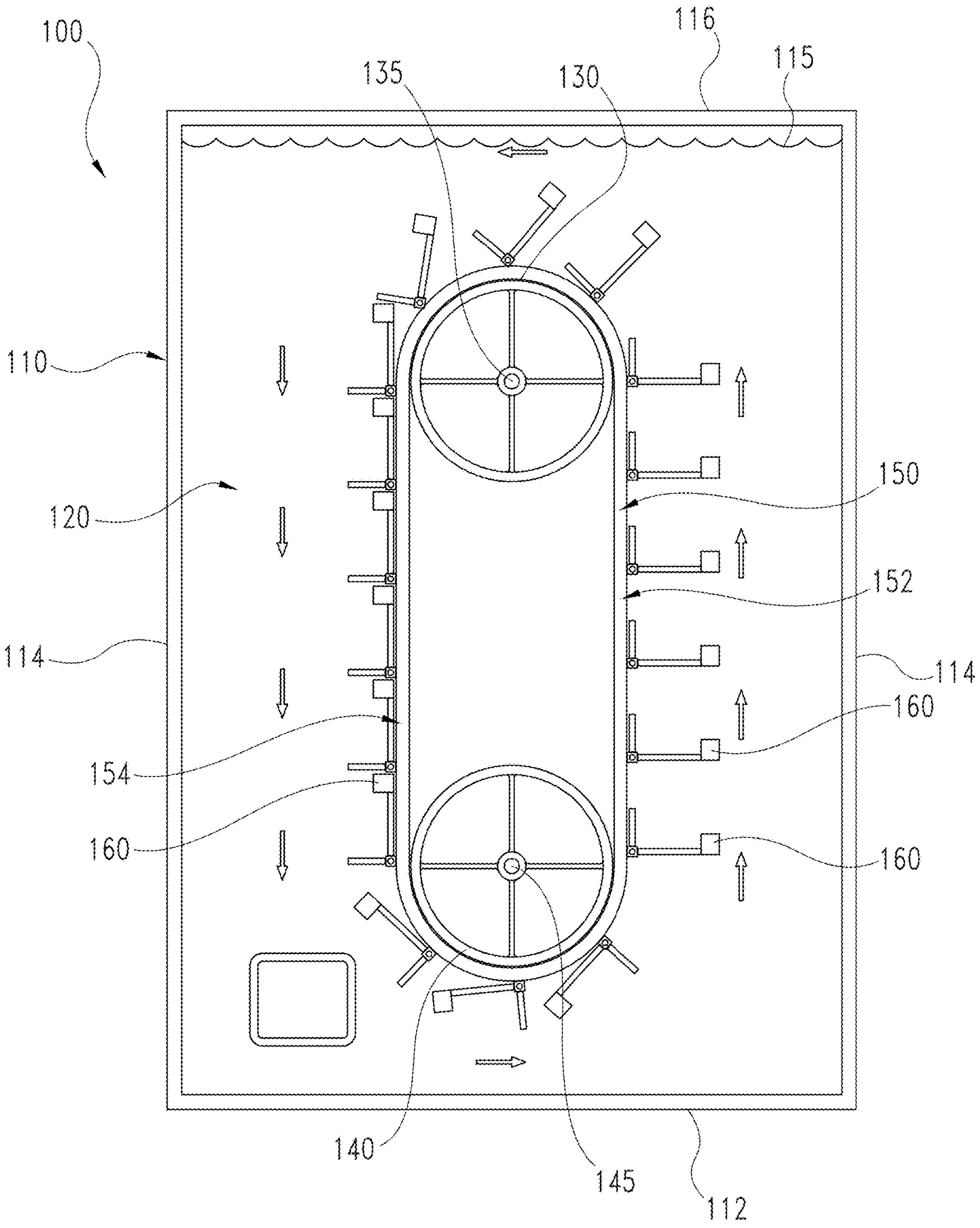
FIG. 1 is a side elevation view of a buoyancy motor.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

A side elevation view of a buoyancy assembly 100 is illustrated in FIG. 1. The buoyancy assembly 100 includes a buoyancy motor 125 positioned within a vessel 110 is illustrated in FIG. 1. In the embodiment shown, the vessel 110 is illustrated as a tank. However, in other embodiments, the vessel may be another variety of container, a pool, a lagoon, or any other structure that is capable of holding a liquid. As shown in FIG. 1, the vessel 110 includes a bottom surface 112 and sidewalls 114 extending from the bottom surface 112. In the embodiment shown, there are a total of four sidewalls 114 that define an interior volume 120 of the vessel 110. In other embodiments, there may be more or fewer sidewalls to modify the shape of the interior volume 120 of the vessel 110 as desired. In some embodiments, the vessel 110 may also include a top surface 116 that acts as a lid to enclose the interior volume 120 of the vessel. In this embodiment, the sidewalls 114 extend between the bottom surface 112 and the top surface 116 of the vessel 110.

The interior volume 120 of the vessel 110 is filled with a liquid that has a liquid level 115 within the vessel 110. The liquid may be water, oil, or any other suitable liquid. In the embodiment shown, the liquid level 115 is positioned near the top surface 116 of the vessel 110. However, in other embodiments, the liquid level 115 may be raised or lowered within the vessel 110 as desired.

In the embodiment shown in FIG. 1, an upper pulley 130 capable of receiving a belt 150 is supported within the vessel 110 by an upper bearing 135. The upper pulley 130 is rotatable about the upper bearing 135. In the embodiment shown, the upper bearing 135 extends between and is supported by opposing sidewalls 114 of the vessel 110. In some embodiments, the upper bearing 135 may extend through at least one of the sidewalls 114 of the vessel 110 so that at least a portion of the upper bearing 135 is positioned exterior to the vessel 110. In these embodiments, a watertight seal may be formed between the sidewall 114 and the upper bearing 135 to prevent leakage of the liquid within the interior volume 120 of the vessel 110.

A lower pulley 140 capable of receiving the belt 150 is supported within the vessel 110 by a lower bearing 145. In the embodiment shown, the lower bearing 145 extends between and is supported by opposing sidewalls 114 of the vessel 110. In some embodiments, the lower bearing 145 may extend through at least one of the sidewalls 114 of the vessel 110 so that at least a portion of the lower bearing 145 is positioned exterior to the vessel 110. In these embodiments, a watertight seal may be formed between the sidewall 114 and the lower bearing 145 to prevent leakage of the liquid within the interior volume 120 of the vessel 110.

The belt 150 extends between and operatively connects the upper pulley 130 and the lower pulley 140. The belt 150 wraps around at least a portion of the circumference of the upper pulley 130 and also wraps around at least a portion of the circumference of the lower pulley 140. For ease of reference, at any given time, a first position 152 of the belt 150 is defined to extend between the upper pulley 130 and the lower pulley 140, and a second position 154 of the belt 150 is defined between the upper pulley 130 and the lower pulley 140, opposite and parallel to the first position 152 of the belt 150. It should be recognized that as the belt 150 moves about the upper pulley 130 and the lower pulley 140 the physical portions of the belt 150 that are located at the first position 152 and the second position 154 of the belt change, but the position of the belt 150 defined as the first position 152 and the second position 154 of the belt 150 stay the same.

A plurality of lift arms 160 are attached to the belt 150 along the length of the belt 150. In the embodiment shown, there are a total of 18 lift arms 160 attached to the belt 150 and the lift arms 160 are evenly spaced around the belt. In other embodiments, there may be more or fewer lift arms 160 attached to the belt 150, as desired. Additionally, in the embodiment shown, each of the lift arms 160 are the same as the other lift arms 160 that are attached to the belt 150.

Figure 2:
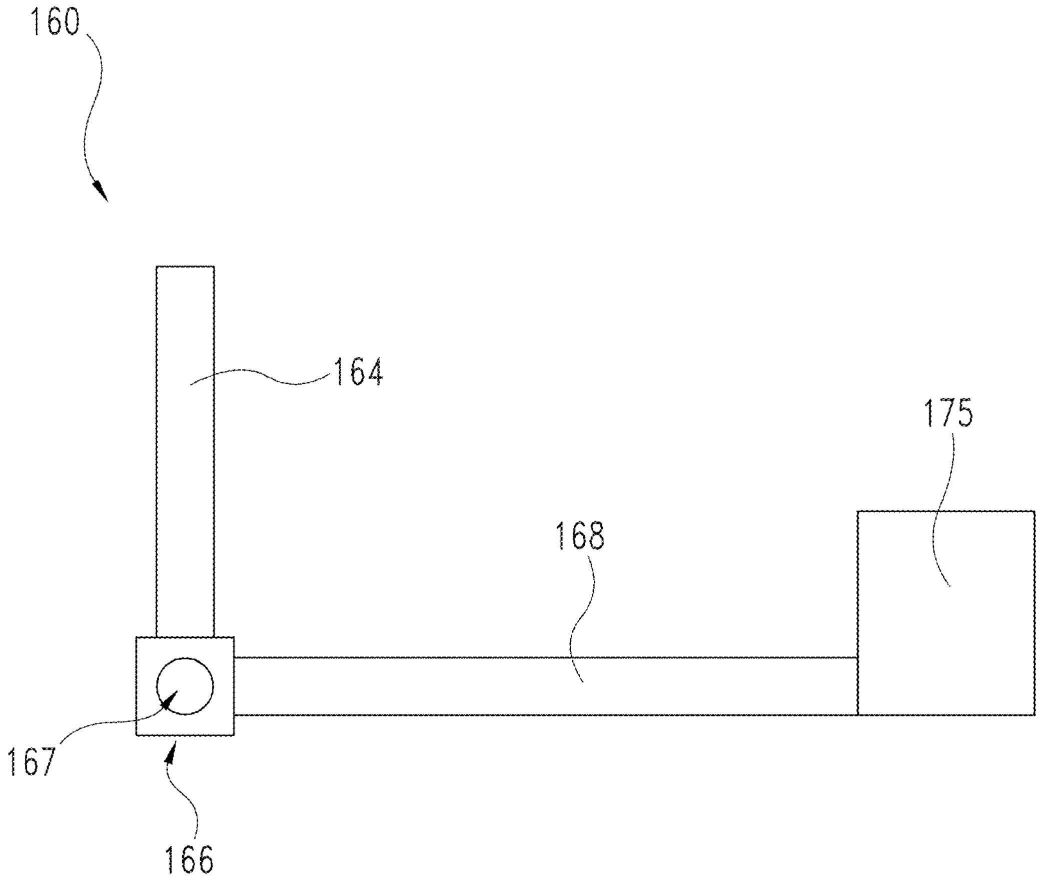
FIG. 2 is a side elevation view of a lift arm of the buoyancy motor of FIG. 1.

A side view of a lift arm 160 is shown in FIG. 2. The lift arm 160 includes a connector arm 164, a lift arm base 166, and a float arm 168. In some embodiments, the lift arm base 166 may define a base opening 167. The connector arm 164 and the float arm 168 are connected at the lift arm base 166 so that the lift arm 160 has an L-shape. In some embodiments, the lift arm 160 is a single monolithic structure. In other embodiments, one or more of the connector arm 164, the lift arm base 166, and the float arm 168 may be separate components that are attached together. A float 175 is attached at the end of the float arm 168 opposite from the lift arm base 166. The float 175 is made from a material or a combination of materials that make the float 175 less dense than the liquid that fills the interior volume 120 of the vessel 110.

Figure 3:
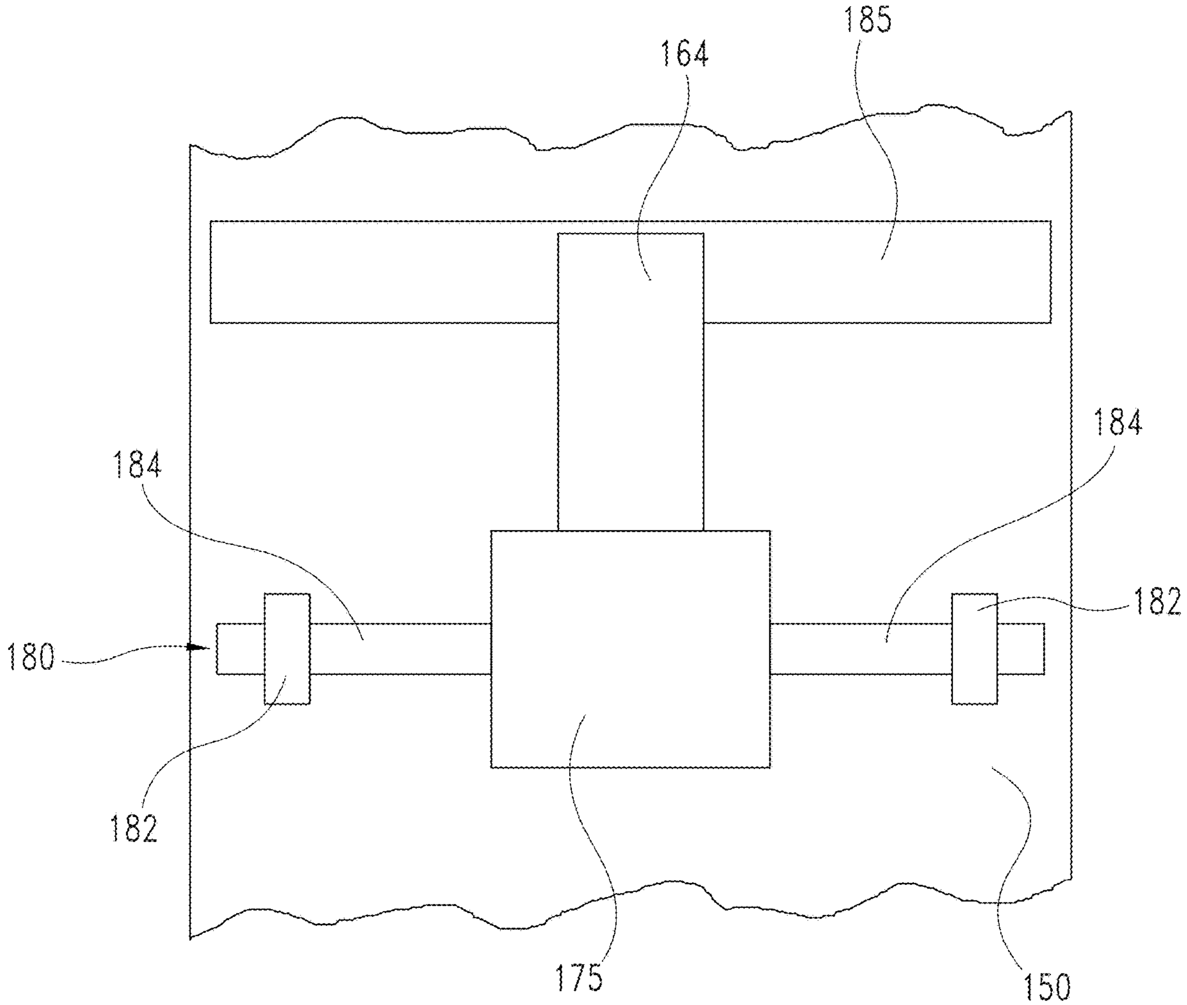
FIG. 3 is a front view of a lift arm of FIG. 2 attached to a belt of the buoyancy motor.

A front view of the lift arm 160 connected to the belt 150 is shown in FIG. 3. A hinge mount 180 is coupled to the belt 150. In the embodiment shown, the hinge mount 180 includes a pair of hinge mount bases 182 that are positioned on the belt 150 and a hinge support rod 184 that extends between the hinge mount bases 182. The hinge support rod 184 may be inserted through the base opening 167 of the lift arm base 166 of the lift arm 160. The lift arm 160 may then hinge about the hinge support rod 184 so that the orientation of the lift arm 160 with respect to the belt 150 may change. In some embodiments, the hinged mount may be formed by a different structure than the hinge mount bases 182 and the hinge support rod 184 that allows the lift arm to hinge with respect to the belt 150. As one example, the hinged mount may be in the form of an L-bracket that allows hinged motion of the lift arm 160.

In some embodiments, the lift arm 160 may be connected to the hinge mount 180 on the belt 150 in a manner that provides lift arm 160 with a limited range of motion with respect to the belt 150. For example, the lift arm 160 may be attached to the hinge mount so that the lift arm may pivot up to 90 degrees with respect to the belt 150. In this example, the float arm 168 may pivot up to 90 degrees with respect to the belt 150, so that, in a first position, the float arm 168 is positioned so that float arm 168 is substantially parallel with respect to the belt 150. In a second position, the float arm 168 is pivoted 90 degrees so that the float arm 168 is substantially perpendicular to the belt 150. In some embodiments, the float arm 168 may be prevented from extending beyond being perpendicular with respect to said belt 150.

Likewise, when the lift arm 160 is connected to the belt 150 at the hinge mount 180 with a limited range of motion, the range of motion of the connector arm 164 is also limited. For example, the connector arm 164 may pivot up to 90 degrees with respect to the belt 150. In the embodiment shown, since the connector arm 164 is perpendicular with respect to the float arm 168. Therefore, in the first position where the float arm 168 is substantially parallel with respect to the belt, the connector arm 164 is substantially perpendicular with respect to the belt 150. In the second position where the float arm 168 is substantially perpendicular with respect to the belt, the connector arm 164 is substantially parallel to the belt 150. When the connector arm 164 is parallel to the belt 150, the connector arm 164 may be supported by a connector arm support 185 positioned on the belt 150.

The lift arm 160 is arranged so that a force applied to the float 175 is transmitted from the float 175 through the float arm 168 to the lift arm base 166 and then to the belt 150. When the vessel 110 is filled with a fluid and the lift arm 160 is submerged within the fluid, the fluid produces lift on the float 175 through a buoyant force. This lift is transmitted from the float 175 to the lift arm base 166 and to the belt 150 to provide an upward force on the belt 150 for each of the lift arms 160 that is submerged in the fluid contained within the vessel 110.

Figure 4:
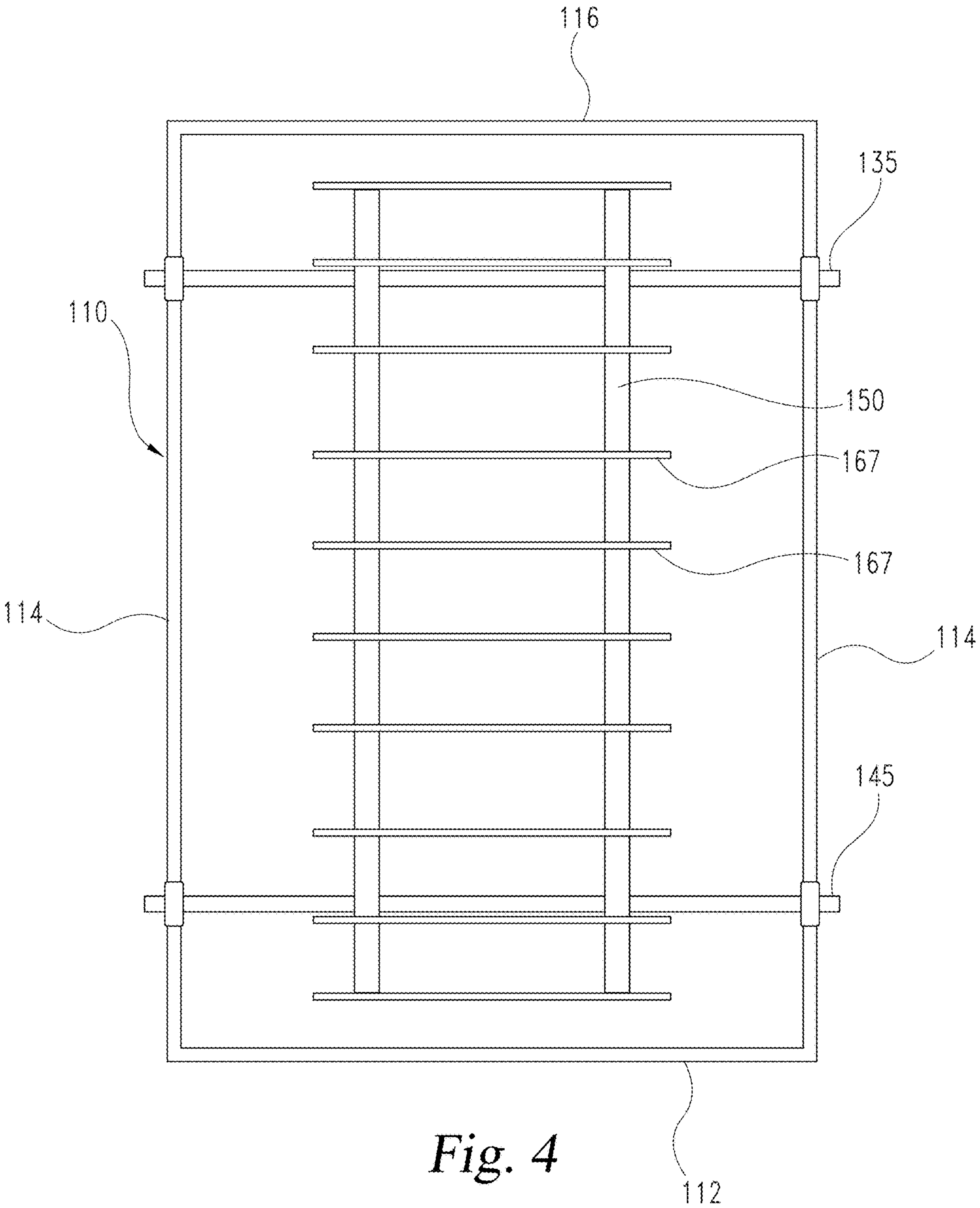
FIG. 4 is a front view of the buoyancy motor of FIG. 1 with the lift arms removed.

A front view of the vessel 110 and the belt 150 without the lift arms 160 mounted on the hinge mounts 180 is shown in FIG. 4. Alternating hinge mounts 180 and connector arm supports 185 are mounted on the belt 150. The hinge mounts 180 and the connector arm supports 185 are spaced apart at even intervals. The hinge mounts 180 are spaced apart at a distance that exceeds the length of the float arm 168 and the float 175 of the lift arm 160. This prevents the hinge mount 180 from impeding the movement of the float 175 as the float 175 and the float arm 168 pivot about the hinge mount 180. As an example, if the length of the float arm 168 including the float 175 is equal to five feet, then the distance between the hinge mounts 180 on the belt 150 is greater than five feet.

Figure 5:
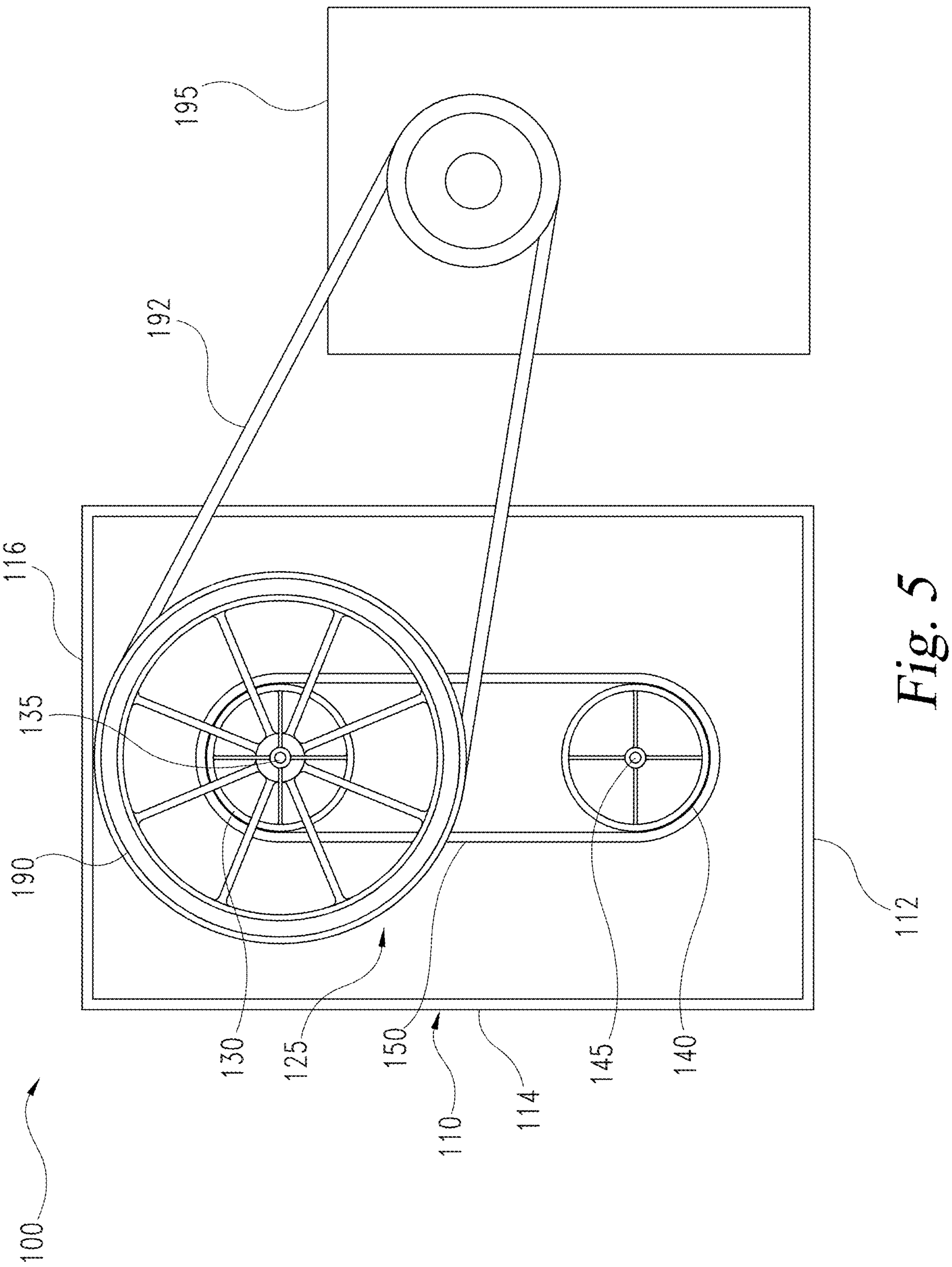
FIG. 5 is a side view of the buoyancy motor of FIG. 1 with a drive pulley.

FIG. 5 illustrates a drive pulley 190 positioned on the upper bearing 135 and positioned outside of the vessel 110. Since the drive pulley 190 is positioned on the same upper bearing 135 as the upper pulley 130, rotation of the upper pulley 130 as the upper pulley is driven by the belt 150, in turn, drives rotation of the drive pulley 190. In other embodiments, the drive pulley 190 may be positioned on the lower bearing 145, so that the drive pulley 190 is rotationally coupled to the lower pulley 140. In the embodiment shown, the drive pulley 190 has a diameter that is greater than a diameter of the upper pulley 130.

The drive pulley 190 may be operationally attached to a generator 195, for example by a drive belt 192, so that rotation of the upper pulley 130 and/or lower pulley 140 causes rotation of the drive pulley 190, which in turn, operates the generator 195 to produce electricity. The diameter of the drive pulley 190 may be modified as desired to adjust the rotations per minute of the drive axle of the generator 195. For example, increasing the diameter of the drive pulley 190 increases the rotation per minute of the drive axle of the generator 195, while decreasing the diameter of the drive pulley 190 decreases the rotation per minute of the drive axle of the generator 195.

In operation, the buoyancy motor 125 uses the buoyancy force of the liquid within the vessel 110 to rotate the belt 150 about the upper pulley 130 and the lower pulley 140. The liquid filling the vessel 110 applies a buoyant force on each of the floats 175 positioned on the lift arms 160 of the buoyancy motor 125. The buoyant force acts upward on each of the floats 175, so that the floats 175 are pushed toward the liquid level 115 within the vessel 110. This upward force is transmitted from the floats 175 to the belt 150 at each point where a lift arm 160 connects to the belt 150 at a connector arm 164.

In the embodiment shown in FIG. 1, each of the float arms 168 of the lift arms 160 at the first position 152 of the belt 150 is extended to be substantially perpendicular with respect to the belt 150. Therefore, the float 175 of these lift arms 160 is positioned at a lateral distance with respect to the belt 150 that is approximately equal to the length of the float arm 168. For these lift arms 160 on the first position 152 of the belt 150, the connector arm 164 is positioned substantially parallel to the belt 150. The connector arm 164 rests on a corresponding connector arm support 185 on the belt 150, assisting to prevent the float arm 168 and the float 175 from lifting past a position that is substantially perpendicular to the belt 150.

In contrast, for the lift arms 160 at the second position 154 of the belt 150, the float arm 168 is extended in a direction that is substantially parallel with respect to the belt 150, while the connector arm 164 is substantially parallel with respect to the belt 150. Therefore, the float 175 of these lift arms 160 is positioned at a lateral distance with respect to the belt 150 that is less than the lateral distance of the float 175 from the belt for the lift arms at the first position 152 of the belt 150.

The float arm 168 acts as a lever that transmits the buoyancy force acting upward on the float 175 of the lift arm 160 to the belt 150 through the connector arm 164. Due to the greater lateral distance between the floats 175 and the belt 150 on the first position 152 of the belt 150 compared to the second position 154 of the belt 150, the force transmitted to the belt 150 by the floats 175 on the first position 152 of the belt 150 is greater than the force transmitted to the belt 150 by the floats 175 on the second position 154 of the belt 150.

The greater force applied by the lift arms 160 on the first position 152 of the belt 150 compared to the force applied by the lift arms 160 on the second position 154 of the belt 150 causes rotation of the belt 150 about the upper pulley 130 and the lower pulley 140. In the example shown in FIG. 1, the belt 150 will rotate in a counterclockwise direction. This, in turn, causes rotation of the upper pulley 130 and the lower pulley 140. In the example shown in FIG. 1, the counterclockwise rotation of the belt 150 causes counterclockwise rotation of the upper pulley 130 and counterclockwise rotation of the lower pulley 140. Rotation of either the upper pulley 130 and/or the lower pulley 140, depending on which is operatively connected to the generator 195 drives the generator 195 to produce electrical power.

A lift arm 160 that starts at the first position 152 of the belt 150 moves toward the upper pulley 130 as the belt 150 rotates. As the lift arm 160 rotates around the upper pulley 130, the buoyancy force from the liquid in the vessel 110 continues to act on the float 175 and causes the lift arm 160 to hinge about the hinge mount 180. The lift arm 160 is hinged so that the float arm 168 moves from a position substantially perpendicular to the belt 150 to a position substantially parallel to the belt 150.

The float arm 168 remains parallel to the belt 150 as the lift arm 160 travels through the second position 154 of the belt 150. When the lift arm 160 reaches the lower pulley 140, the lift arm 160 is pulled by the belt 150 around the lower pulley 140. The lift arm 160 reaches the bottom of the lower pulley 140 and is pulled upward, around the lower pulley 140, by the belt 150. As the lift arm 160 moves around the lower pulley 140, the buoyant force applied to the float 175 by the liquid in the vessel 110 causes the lift arm 160 to hinge about the hinge mount 180 once again. The lift arm 160 hinges so that the float arm 168 and the float 175 are moved to a position that is substantially perpendicular with respect to the belt 150. The connector arm 164 once again comes into contact with the connector arm support 185 on the belt, and prevents further rotation of the float arm 168 and the float 175 so that the float arm 168 and the float remain in the perpendicular orientation while on the first position 152 of the belt 150. The process then repeats as the belt 150 continues to rotate around the upper pulley 130 and the lower pulley 140.

Figure 6:
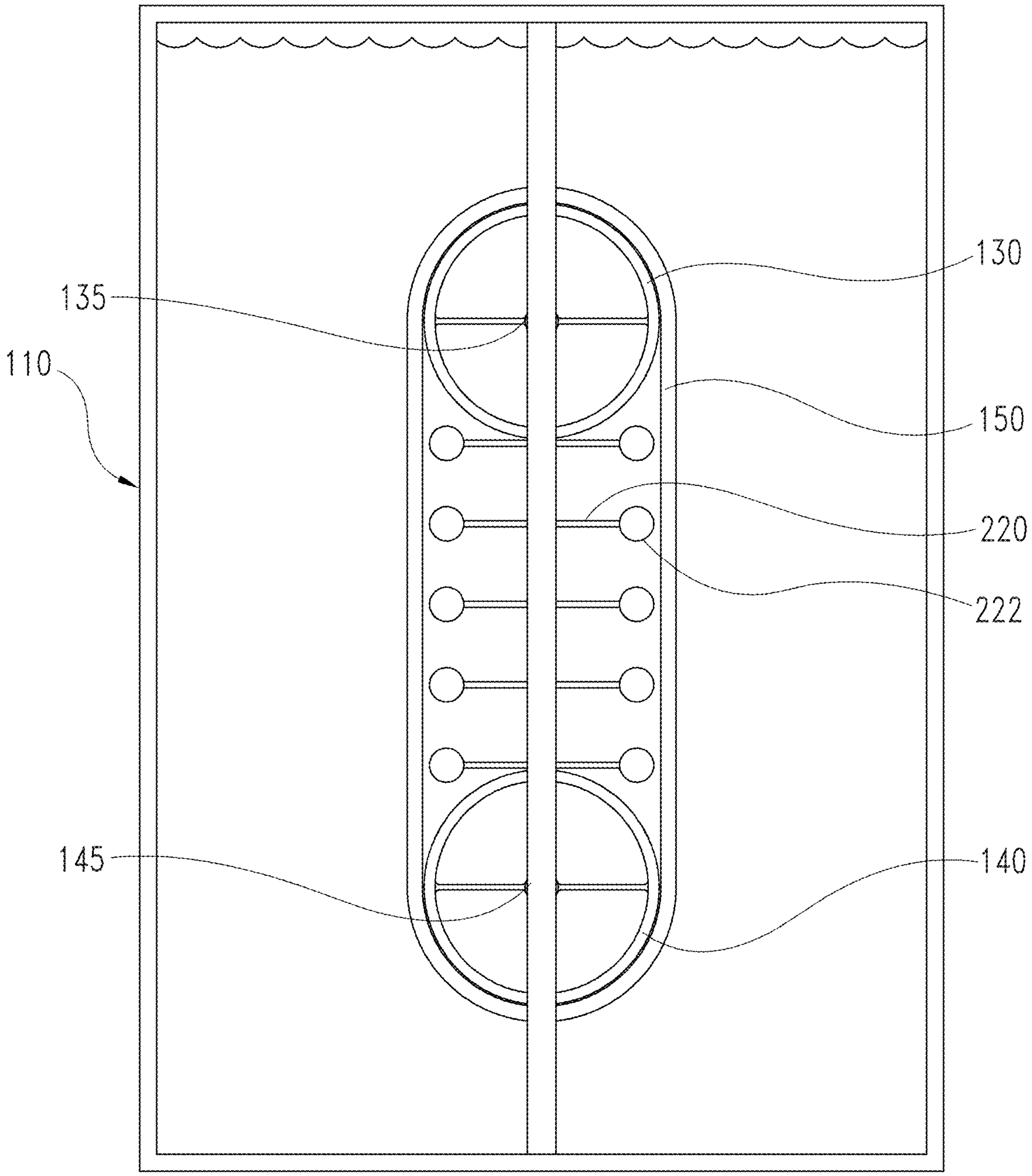
FIG. 6 is a side view of the buoyancy motor of FIG. 1 with internal supports for the belt.

As shown in FIG. 6, in some embodiments, interior axles 220 may be positioned to extend between the first position 152 of the belt 150 and the second position 154 of the belt 150. These interior axles 220 may include bearings 222 which may contact the belt 150 to provide further support for the belt 150. As shown in FIG. 6, the axles 220 may be positioned to extend orthogonally with respect to the upper bearing 135 and the lower bearing 145.

Figure 7:
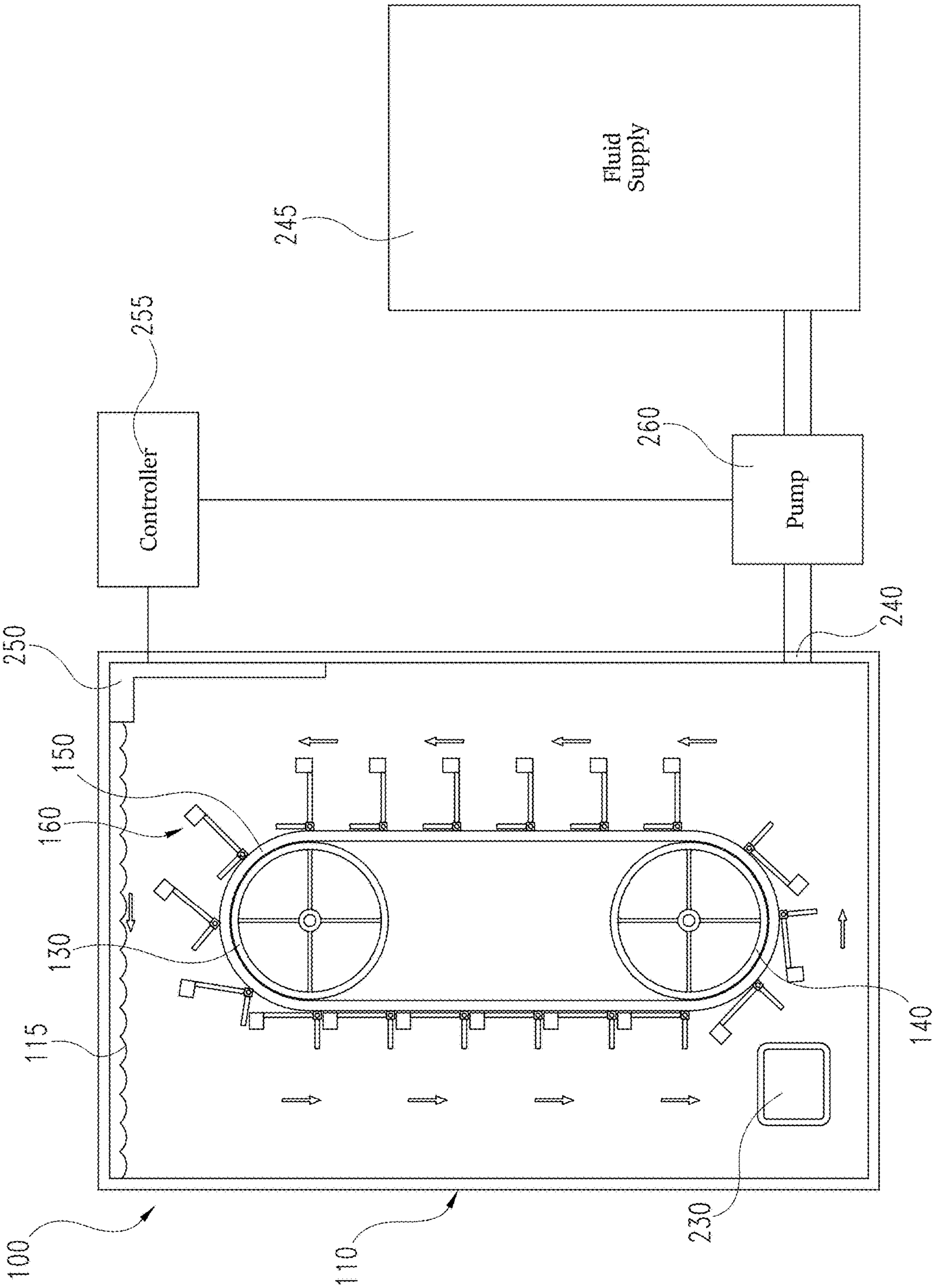
FIG. 7 is a diagram of a system including the buoyancy motor of FIG. 1 with a pump for supplying liquid to the buoyancy motor.

An alternative embodiment of the buoyancy motor is shown in FIG. 7. In this embodiment, the vessel 110 may include an access opening 230, such as a door, that allows maintenance to be performed on the buoyancy motor 125 within the vessel 110. In the embodiment shown, the access opening 230 is defined in one of the sidewalls 114 of the vessel 110. A water tight seal is formed around the access opening 230 to prevent the liquid within the interior volume 120 from leaking while the liquid is within the interior volume 120 of the vessel 110 and the access opening 230 is closed.

The vessel 110 may include a valve 240 that allows the interior volume 120 of the vessel 110 to be filled or drained as desired. In some instances, a water supply 245 may be in fluid communication with the valve 240. A liquid level sensor 250 within the vessel 110 may be used to measure the liquid level 115 of the liquid within the interior volume 120 of the vessel 110. A controller 255 in communication with the liquid level sensor 250 may operate a pump 260 that capable of supplying water from the water supply to the vessel 110 through the valve when the liquid level 115 falls below a predetermined height. In some instances, the pump 260 may also be operated to assist in draining the interior volume 120 of the vessel 110 when desired. Some embodiments may include an additional valve and pipe leading to the water supply 245 to allow for liquid to be removed from the vessel 110 and moved into the water supply 245.

While embodiments of the disclosure have been illustrated and described in detail in the drawings and foregoing description, the same is to be considered as illustrative and not restrictive in character, it being understood that only some embodiments have been shown and described and that all changes and modifications that come within the spirit of the disclosures herein are desired to be protected.

The invention claimed is:

1. A buoyancy assembly comprising:
- a vessel including an interior volume containing a liquid, wherein said liquid defines a liquid level within said vessel;
- a buoyancy motor positioned in the interior volume of said vessel, said buoyancy motor comprising:
  - an upper pulley, wherein said upper pulley is positioned below said liquid level;
  - a lower pulley, wherein said lower pulley is positioned below said liquid level;
  - a belt extending between and wrapped at least partially around both said upper pulley and said lower pulley, wherein said belt includes a first position defined between a side of said upper pulley and said lower pulley and a second position defined between an opposite side of said upper pulley and said lower pulley with respect to said first position; and
  - a plurality of lift arms, wherein each lift arm is hingedly coupled to said belt at a hinged mount, and wherein each of said lift arms includes a connector arm, a float arm, and a float attached to said float arm;
- wherein said plurality of lift arms are spaced evenly along a length of said belt; and
- wherein said float arms of said lift arms positioned on said first position of said belt are oriented perpendicularly with respect to said belt, and wherein said float arms of said lift arms positioned on said second position of said belt are oriented parallel with respect to said belt wherein said connector arms of said lift arms positioned at said first position of said belt are oriented parallel with respect to said belt, and wherein said connector arms of said lift arms positioned at said second position of said belt are oriented perpendicular with respect to said belt.

2. The buoyancy assembly of claim 1, wherein said vessel includes a bottom surface and a plurality of sidewalls extending from said bottom surface to define the vessel interior volume.

3. The buoyancy assembly of claim 2, wherein an upper bearing extends between two of said plurality of sidewalls, and wherein said upper bearing supports said upper pulley so that said upper pulley is rotatable about said upper bearing.

4. The buoyancy assembly of claim 3, wherein a lower bearing extends between two of said plurality of sidewalls, and wherein said lower bearing supports said lower pulley so that said lower pulley is rotatable about said lower bearing.

5. The buoyancy assembly of claim 2, further comprising:
- an access opening defined in one of said plurality of sidewalls, wherein said access opening provides access into said interior volume of said vessel.

6. The buoyancy assembly of claim 1, further comprising:
- a drive pulley positioned on an exterior of said vessel, wherein said drive pulley is rotatably coupled to one of said upper pulley or said lower pulley.

7. The buoyancy assembly of claim 6, wherein said drive pulley is operationally coupled to a generator, and wherein rotation of said drive pulley generates electricity at said generator.

8. The buoyancy assembly of claim 6, wherein a diameter of said drive pulley is greater than a diameter of said upper pulley and a diameter of said lower pulley.

9. The buoyancy assembly of claim 1, further comprising:
a water supply in fluid communication with the interior volume of said vessel;
a liquid level sensor positioned within said vessel, wherein said liquid level sensor is configured to measure the liquid level of said liquid within said vessel;
a controller in communication with said liquid level sensor and in communication with a pump in fluid communication with the water supply; and
wherein said controller is configured to operate said pump to supply water from said water supply to said vessel when said liquid level is measured below a predetermined height in said vessel.

10. The buoyancy assembly of claim 1, wherein each of said lift arms is positioned below said liquid level within said vessel.

11. The buoyancy assembly of claim 1, wherein each float of said plurality of lift arms has a same density and same volume as each of the other floats of said plurality of lift arms.

12. A method comprising:
positioning a buoyancy motor within a vessel so that said buoyancy motor is below a liquid level of a liquid that is contained within an interior volume of said vessel, wherein said buoyancy motor includes an upper pulley, a lower pulley, a belt extending between said upper pulley and said lower pulley, and a plurality of lift arms hingedly attached to said belt, wherein a connector arm, a float arm and a float attached to said float arm;
rotating said belt, wherein said rotation of said belt is driven by a buoyancy force of said liquid within said interior volume of said vessel acting on said floats of said lift arms;
wherein said belt includes a first position, and said float of each of said lift arms positioned at the first position on said belt extends substantially perpendicular to said belt; and
wherein said belt includes a second position, and said float of each of said lift arms positioned at the second position on said belt extends substantially parallel to said belt; and wherein said connector arms of said lift arms positioned at said first position of said belt are oriented parallel with respect to said belt, and wherein said connector arms of said lift arms positioned at said second position of said belt are oriented perpendicular with respect to said belt; and
wherein said lift arm hinges with respect to said belt as said lift arm rotates with said belt around said upper pulley and said lower pulley.

13. The method of claim 12, further comprising:
filling at least a portion of said interior volume of said vessel with a liquid to position said buoyancy motor below the liquid level of the liquid.

14. The method of claim 12, wherein said belt is supported on said upper pulley so that rotation of said belt drives rotation of said upper pulley.

15. The method of claim 12, wherein said float arm hinges with respect to said belt so that said float arm moves from being substantially perpendicular to said belt to being substantially parallel to said belt as said lift arm moves from said first position of said belt to said second position of said belt.

16. The method of claim 15, wherein said float arm moves from the position substantially parallel to said belt to the position substantially perpendicular to said belt as said lift arm moves from said second position of said belt to said first position of said belt.

17. The method of claim 12, wherein buoyancy force applied by said liquid within said vessel on the floats of said lift arms is transmitted to said belt at a lift arm base that is attached to said belt.

18. The method of claim 12, further comprising:
sensing the liquid level of the liquid within the interior volume of said vessel; and
pumping liquid into said vessel if said liquid level is below a predetermined height.

19. The method of claim 12, further comprising:
driving a generator to generate electricity, wherein said generator is driven by a drive pulley, and wherein said drive pulley is rotatably coupled to one of said upper pulley or said lower pulley.

* * * * *